Jan. 9, 1951 D. V. WOODWARD 2,537,501
PORTABLE POWER-DRIVEN SAW
Filed July 19, 1945 2 Sheets-Sheet 1
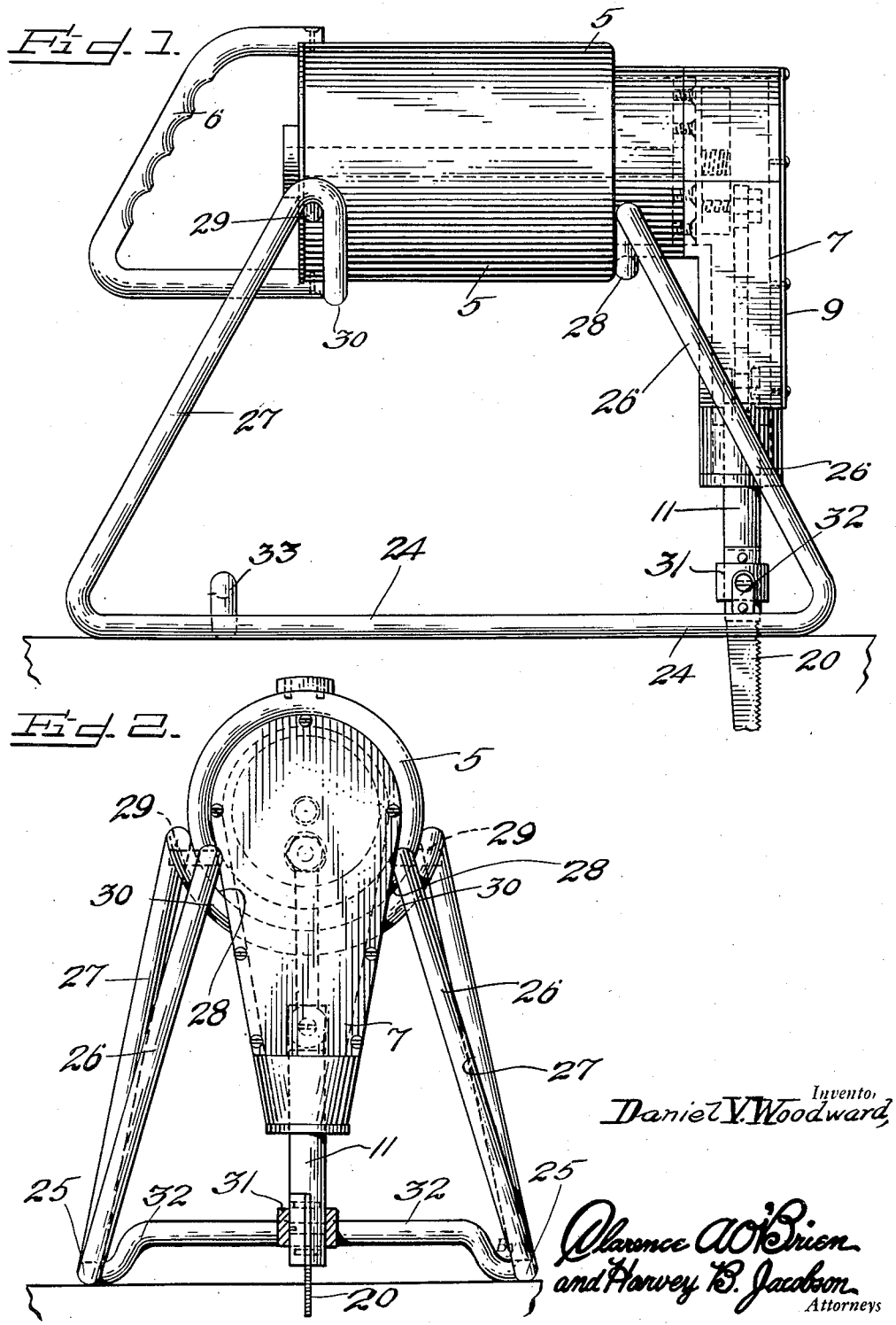

Jan. 9, 1951 D. V. WOODWARD 2,537,501
PORTABLE POWER-DRIVEN SAW
Filed July 19, 1945 2 Sheets-Sheet 2
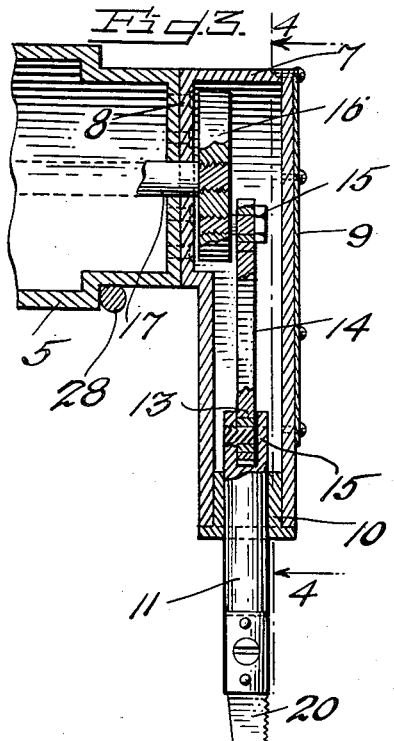
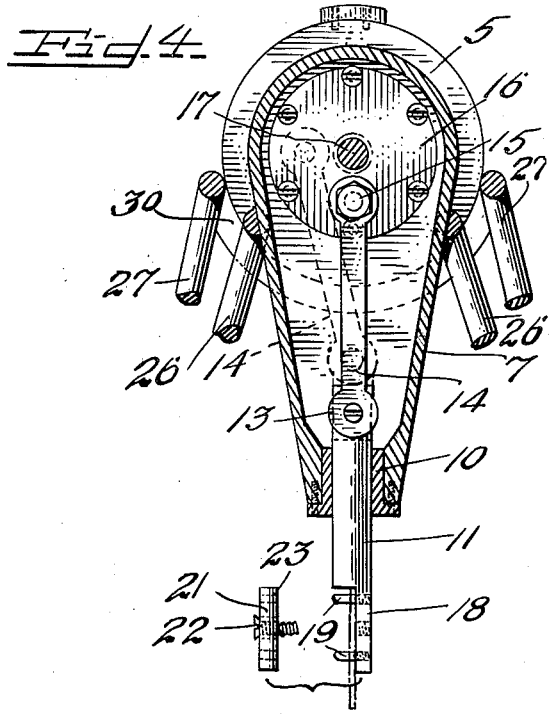
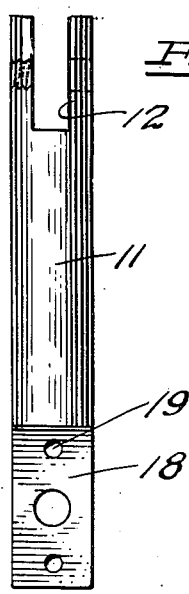
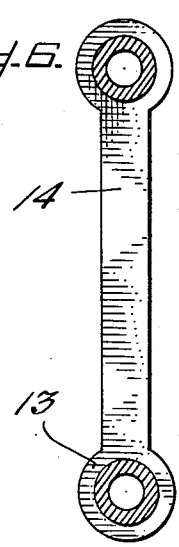
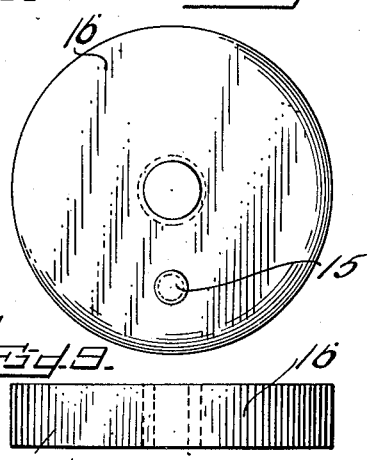
Inventor
Daniel V. Woodward,
By Clarence A. O'Brien
and Harvey B. Jacobson
Attorneys Patented Jan. 9, 1951

2,537,501

UNITED STATES PATENT OFFICE 2,537,501

PORTABLE POWER-DRIVEN SAW

Daniel V. Woodward, Chicago, Ill.

Application July 19, 1945, Serial No. 605,868

1 Claim. (Cl. 143—68)

The present invention relates to new and useful improvements in portable power driven saws and more particularly to a saw of this character adapted for cutting plywood, or other light material.

An important object of the present invention is to provide a motor driven reciprocating saw mounted on skids for supporting the motor while giuding the saw during its cutting action.

A further object of the invention is to provide a saw of this character including a support for the motor used for driving the saw and which serves to absorb vibration or shock during the rapid reciprocating movement of the saw.

A still further object is to provide an apparatus of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view,

Figure 2 is a front elevational view,

Figure 3 is a fragmentary vertical sectional view of the pitman housing for driving the saw, Figure 4 is a similar view taken substantially on the line 4—4 of Figure 3, Figure 5 is an enlarged elevational view of the connector between the pitman and the saw, Figure 6 is a side elevational view of the pitman, Figure 7 is an edge elevational view thereof, Figure 8 is a front elevational view of the disc for driving the pitman, and Figure 9 is a side elevational view thereof.

Referring now to the drawings in detail wherein for the purpose of illustration I have disclosed a preferred embodiment of the invention, the numeral 5 designates an electric motor having a handle 6 attached at its rear end and having a pitman housing 7 attached at its front end by means of screws or the like 8. The front of the housing 7 is provided with a removable cover plate 9.

The housing 7 is of elongated construction and extends downwardly from the front end of the motor 5 and is provided with a bushing 10 in its lower end in which a connecting pin 11 is slidably mounted.

The inner end of the pin 11 is bifurcated as indicated at 12 for receiving the eye 13 of a pitman rod 14 for pivotally attaching thereto by means of a pin 15.

The upper end of the pitman rod 14 is pivoted on a pin or screw 15 mounted eccentrically in a disc 16 secured to the motor shaft 17 which projects into the housing 7.

The lower end of the connecting pin 11 is cut away at one side to provide a reduced extension 18 having a pair of laterally projecting pins 19 for attaching the inner end of a saw blade 20 thereto, the saw blade being secured in position against one side of the reduced extension 18 by means of a clamping block 21 secured to the extension by a screw 22 and also having openings 23 for receiving the pins 19.

The motor 5 is supported in an elevated position by means of a pair of skids 24 and 25 of rod material extending longitudinally below the lower end of the housing 7 forwardly and rearwardly thereof, the ends of the skids having front and rear legs 26 and 27, the front legs of the respective skids being connected by a transversely extending arcuate saddle 28 on which the front end of the motor 5 is seated and the rear legs 27 being hooked over pins 29 projecting outwardly from the opposite sides of the motor 5 and extending downwardly therefrom and also connected by a transversely extending arcuate saddle 30 in which the rear end of the motor 5 is seated as will be apparent from an inspection of Figures 1 and 2 of the drawings.

The motor is thus supported in an elevated position above the work and the skids 24 and 25 facilitate the sliding movement of the motor along the work for guiding the saw 20 during its cutting action.

The rotary movement of the motor shaft 17 is converted into reciprocating movement for the saw 20 through the pitman 14.

A guide 331 is provided for the pin 11 of the saw to eliminate tendency of the saw from turning off a given line, the guide being supported by a transverse upwardly offset bar 32 between the bottoms of the skids 24 and 25. The skids are also provided with a rear cross member 33 similar to said bar 32 which cooperates with the front bar 32 to support the device on the edge of the work, with the bottoms of the skids straddling said edge to act as guides when the device is moved along said edge.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A portable power-driven saw device comprising an elongated cylindrical motor having a saw at one end thereof to which said motor is operatively connected, a pair of U-shaped rod-like skids at opposite sides of said motor including, respectively, front and rear legs, a pair of transversely extending downwardly curved saddle members connecting said legs at the upper ends thereof in front and rear pairs and supporting said motor at opposite ends thereof, one of said members at the juncture thereof with the legs connected thereby forming a pair of hooks upon opposite sides of said motor, a pair of pins extending from the opposite sides of said motor with said hooks straddling the same, said hooks and pins securing the motor in the saddle members, and a pair of transverse bars cross-connecting the bottoms of said skids adjacent the front and rear legs and being upwardly offset from said bottoms for cooperation therewith to support the device on the edge of the work with said bottoms straddling said edge to act as guides when the device is moved along said edge.

DANIEL V. WOODWARD.

REFERENCES CITED

The following references are of record in the file of this patent:

UNITED STATES PATENTS

| Number | Name | Date |
|---|---|---|
| 1,414,265 | Dylnicki | Apr. 25, 1922 |
| 1,542,127 | Hastings | June 16, 1925 |
| 1,607,197 | Hatleli | Nov. 16, 1926 |
| 1,620,374 | Maloney | Mar. 8, 1927 |
| 1,707,097 | Ruschke | Mar. 26, 1929 |
| 1,745,293 | Campbell | Jan. 28, 1930 |
| 1,808,228 | Hulack et al. | June 2, 1931 |
| 2,142,620 | Stanley | Jan. 3, 1939 |

FOREIGN PATENTS

| Number | Country | Date |
|---|---|---|
| 555,086 | Great Britain | Aug. 4, 1943 |
| 626,962 | France | May 28, 1927 |